United States Patent [19]
Deitz et al.

[11] Patent Number: 5,599,911
[45] Date of Patent: Feb. 4, 1997

[54] FIBER-REACTIVE DYES HAVING A CENTRAL 1,3,5-TRIAZINE RING TO WHICH ARE BONDED TO A MONOAZO CHROMOPHORE HAVING ANOTHER 1,3,5-TRIAZINE MOIETY AND A SECOND CHROMOPHORE

[75] Inventors: Rolf Deitz, Basel, Switzerland; Bernhard Müller, Efringen-Kirchen, Germany; Athanassios Tzikas, Pratteln, Switzerland

[73] Assignee: Ciba-Geigy Corporation, Tarrytown, N.Y.

[21] Appl. No.: 296,206

[22] Filed: Aug. 25, 1994

[30] Foreign Application Priority Data

Sep. 1, 1993 [CH] Switzerland ............................. 2599/93

[51] Int. Cl.⁶ .................... C09B 62/006; C09B 62/08; C09B 62/507; D06P 1/38
[52] U.S. Cl. .................... 534/618; 534/617; 534/624; 534/634; 8/549
[58] Field of Search .................... 534/634, 617, 534/618, 624; 8/549

[56] References Cited

U.S. PATENT DOCUMENTS

| | | | |
|---|---|---|---|
| 3,349,074 | 10/1967 | Andrew | 534/624 |
| 4,742,160 | 5/1988 | Dore et al. | 534/605 |
| 4,925,927 | 5/1990 | Tzikas | 534/618 |
| 5,200,511 | 4/1993 | Loeffler et al. | 534/634 |

FOREIGN PATENT DOCUMENTS

| | | |
|---|---|---|
| 0302006 | 2/1989 | European Pat. Off. . |
| 0511523 | 11/1992 | European Pat. Off. . |
| 0624629A1 | 11/1994 | European Pat. Off. . |
| 3440777 | 5/1985 | Germany . |
| 62-7765 | 1/1987 | Japan . |
| 1015931 | 1/1966 | United Kingdom ................... 534/624 |
| 1063501 | 3/1967 | United Kingdom ................... 534/634 |
| 1067152 | 5/1967 | United Kingdom ................... 534/624 |

Primary Examiner—Fiona T. Powers
Attorney, Agent, or Firm—Kevin T. Mansfield

[57] ABSTRACT

Reactive dyes of the formula

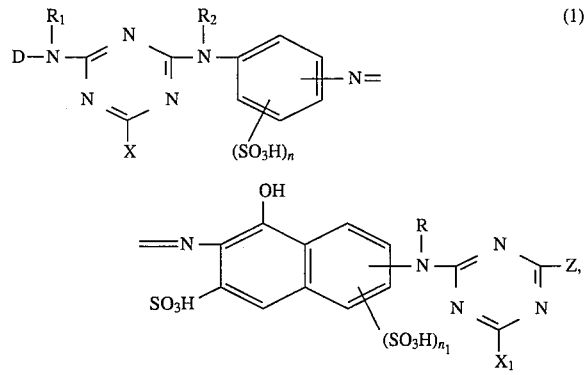

in which the variables have the meanings stated in the claims, are described. The dyes according to the invention are particularly suitable for dyeing cellulosic fibre materials and give dyeings with good fastness properties and a high color yield.

13 Claims, No Drawings

FIBER-REACTIVE DYES HAVING A CENTRAL 1,3,5-TRIAZINE RING TO WHICH ARE BONDED TO A MONOAZO CHROMOPHORE HAVING ANOTHER 1,3,5-TRIAZINE MOIETY AND A SECOND CHROMOPHORE

The present invention relates to novel reactive dyes, processes for their preparation and their use for dyeing or printing fibre materials.

The practice of dyeing with reactive dyes has in recent times led to more stringent requirements on the quality of the dyeings and the economics of the dyeing process. As a consequence thereof there continues to be a need for novel reactive dyes which have improved properties, in particular in respect of application.

The reactive dyes required for dyeing nowadays must have adequate substantivity and, at the same time, the unfixed product must be easily washed off. They should furthermore display a good colour yield and have high reactivity, the intention being in particular to provide dyeings with high degrees of fixing. The known dyes do not meet these requirements in all properties.

The present invention is therefore based on the object of finding novel, improved reactive dyes for dyeing and printing fibre materials which have the qualities characterized above to a high degree. The novel dyes ought in particular to be distinguished by high fixing yields and high fibre-dye binding stabilities, and moreover it ought to be easy to wash off the unfixed product from the fibres. They should furthermore afford dyeings with good general fastness properties, for example light and wet fastness properties.

It has emerged that the object is substantially achieved by the novel reactive dyes defined hereinafter.

The present invention relates to reactive dyes of the formula

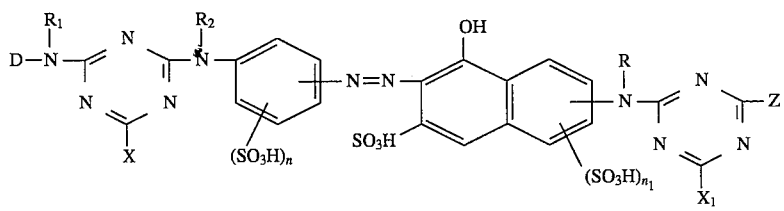

(1)

in which

D is the radical of a monoazo, polyazo, metal complex azo, anthraquinone, phthalocyanine, formazan or dioxazine chromophore, R, $R_1$ and $R_2$ are each, independently of one another, hydrogen or $C_1$–$C_4$alkyl which can be substituted by halogen, hydroxyl, cyano, $C_1$–$C_4$alkoxy, $C_1$–$C_4$alkoxycarbonyl, carboxyl, sulfamoyl, sulfo or sulfato, X is chlorine, fluorine, bromine, 3-carboxy-1-pyridinyl or 3-carbamoyl-1-pyridinyl, $X_1$ and Z each, independently of one another, have one of the meanings specified for X or are hydroxyl, $C_1$–$C_4$alkoxy, phenoxy, $C_1$–$C_4$alkylthio, morpholino, amino which can be substituted by unreactive radicals, or a reactive radical of the formula

(2a)

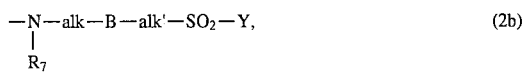

(2b)

(2c)

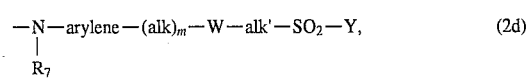

(2d)

(2e)

or

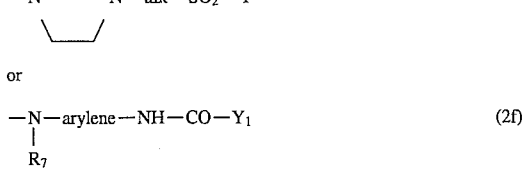

(2f)

$R_6$ is hydrogen, $C_1$–$C_4$alkyl which can be substituted by hydroxyl, sulfo, sulfato, carboxyl or cyano, or a radical

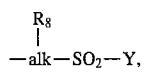

$R_7$ is hydrogen or $C_1$–$C_4$alkyl, $R_8$ is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —$SO_2$—Y, alk and alk' are, independently of one another, $C_1$–$C_6$alkylene, arylene is a phenylene or naphthylene radical which is unsubstituted or substituted by sulfo, carboxyl, $C_1$–$C_4$alkyl, $C_1$–$C_4$alkoxy or halogen, Y is vinyl or a radical —$CH_2$—$CH_2$—U and U is a leaving group, $Y_1$ is a group —$CHX_2$—$CH_2X_2$ or —$CX_2$=$CH_2$ and $X_2$ is chlorine or bromine, B is the radical —O— or —$NR_7$—, W is a group —$SO_2$—$NR_6$—, —$CONR_6$— or —$NR_6CO$—, and m is the number 0 or 1, n is the number 1 or 2 and $n_1$ is the number 0 or 1.

$C_1$–$C_4$Alkyl is, in general, methyl, ethyl, n- or iso-propyl or n-, iso-, sec- or tert-butyl;

$C_1$–$C_4$alkoxy generally embraces methoxy, ethoxy, n- or iso-propoxy and n-, iso-, sec- or tert-butoxy; halogen is, in general, for example fluorine, bromine or, in particular, chlorine; $C_1$–$C_4$alkoxycarbonyl is, in general, methoxycarbonyl, ethoxycarbonyl, n- or iso-propoxycarbonyl or n-, iso-, sec- or tert-butoxycarbonyl, preferably methoxycarbonyl or ethoxycarbonyl. Examples of $C_1$–$C_4$alkanoyloxy are acetyloxy or propionyloxy. Examples of $C_1$–$C_4$alkylthio are methylthio and ethylthio.

Examples of suitable alkyl radicals R, $R_1$ and $R_2$ are unsubstituted $C_1$–$C_4$alkyl, carboxymethyl, β-carboxyethyl, β-carboxypropyl, methoxycarbonylmethyl, ethoxycarbonyl-ethyl, β-methoxyethyl, β-ethoxyethyl, β-methoxypropyl, β-chloroethyl, β-hydroxyethyl, β-hydroxybutyl, β-cyanoethyl, sulfomethyl, β-sulfoethyl, β-sulfatoethyl and γ-bromopropyl.

R, $R_1$ and $R_2$ are each, independently of one another, preferably hydrogen or $C_1$–$C_4$alkyl, particularly preferably hydrogen, methyl or ethyl and especially preferably hydrogen.

X is preferably fluorine or chlorine.

If $X_1$ or Z is amino which can be substituted by unreactive radicals, possibilities are amino, N-$C_1$–$C_4$alkylamino or N,N-di-$C_1$–$C_4$alkylamino where the alkyl can be substituted for example by sulfo, sulfato, hydroxyl, carboxyl or phenyl, or cyclohexylamino, N-$C_1$–$C_4$alkyl-N-phenylamino or phenylamino or naphthylamino where the phenyl or naphthyl can be substituted for example by $C_1$–$C_4$alkyl, $C_1$–$C_4$alkoxy, $C_2$–$C_4$alkanoylamino, carboxyl, sulfo or halogen.

Examples of suitable unreactive radicals $X_1$ and Z are, independently of one another, amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy as well as hydroxyl.

As unreactive radical, $X_1$ and Z each have, independently of one another, preferably the meaning of $C_1$–$C_4$alkoxy, $C_1$–$C_4$alkylthio, hydroxyl, amino, N-$C_1$–$C_4$alkylamino which is unsubstituted or substituted by hydroxyl, sulfato or sulfo in the alkyl moiety, or morpholino, phenylamino or N-$C_1$–$C_4$alkyl-N-phenylamino in which the phenyl is in each case unsubstituted or substituted by sulfo, carboxyl, acetylamino, methyl or methoxy.

Particularly preferred unreactive radicals $X_1$ and Z are each, independently of one another, amino, N-methylamino, N-ethylamino, morpholino, phenylamino, 2-, 3- or 4-sulfophenylamino or N-$C_1$–$C_4$alkyl-N-phenylamino.

Suitable leaving groups U are, for example, —Cl, —Br, —F, —OSO$_3$H, —SSO$_3$H, —OCO—CH$_3$, —OPO$_3$H$_2$, —OCO—CCl$_3$, —OCO—CHCl$_2$, —OCO—CH$_2$Cl, —OSO$_2$—C$_1$–C$_4$alkyl, —OSO$_2$—N(C$_1$–C$_4$alkyl)$_2$ or —OCO—C$_6$H$_5$.

U is preferably a group of the formula —Cl, —OSO$_3$H, —SSO$_3$H, —OCO—CH$_3$, —OCO—C$_6$H$_5$ or —OPO$_3$H$_2$, in particular —Cl or —OSO$_3$H, preferably —OSO$_3$H.

Y is preferably vinyl, β-chloroethyl, β-sulfatoethyl, β-thiosulfatoethyl, β-acetoxyethyl, β-phenoxyethyl or β-phosphatoethyl and, particularly preferably, β-sulfatoethyl or vinyl.

$X_2$ is preferably bromine.

alk and alk' are, independently of one another, for example a methylene, ethylene, 1,3-propylene, 1,4-butylene, 1,5-pentylene or 1,6-hexylene radical or branched isomers thereof.

alk and alk' are each, independently of one another, preferably a $C_1$–$C_4$alkylene radical and, especially preferably, an ethylene radical or propylene radical.

Arylene is preferably a 1,3- or 1,4-phenylene radical which is unsubstituted or substituted for example by sulfo, methyl, methoxy or carboxyl, and is particularly preferably an unsubstituted 1,3- or 1,4-phenylene radical.

$R_6$ is preferably hydrogen or $C_1$–$C_4$alkyl such as methyl, ethyl, propyl, isopropyl, butyl, isobutyl, sec-butyl or tert-butyl. $R_6$ is particularly preferably hydrogen.

$R_7$ is preferably hydrogen, methyl or ethyl, especially hydrogen.

$R_8$ is preferably hydrogen.

B is preferably —NH— or —O— and, especially preferably, —O—.

W is preferably a group of the formula —CONH— or —NHCO—, in particular a group of the formula —CONH—.

Preferred reactive radicals of the formulae (2a) to (2f) are those in which W is a group of the formula —CONH— or —NHCO—, $R_6$, $R_7$ and $R_8$ are each hydrogen, B is the radical —O— or —NH—, alk and alk' are each, independently of one another, ethylene or propylene, arylene is phenylene which is unsubstituted or substituted by methyl, methoxy, carboxyl or sulfo, Y is vinyl or β-sulfatoethyl, $Y_1$ is —CHBr—CH$_2$Br or —CBr=CH$_2$ and m is the number 0.

Particularly preferred fibre-reactive radicals $X_1$ or Z correspond to the formula

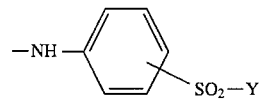

(2c')

or

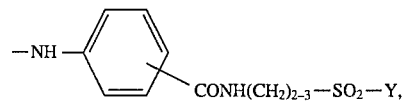

(2d')

in which Y is vinyl or β-sulfatoethyl.

$X_1$ is preferably chlorine, fluorine, amino, N-$C_1$–$C_4$alkylamino which is unsubstituted or substituted by hydroxyl, sulfato or sulfo in the alkyl moiety, morpholino or phenylamino or N-$C_1$–$C_4$alkyl-N-phenylamino in which the phenyl is in each case unsubstituted or substituted by sulfo, carboxyl, acetylamino, methyl or methoxy. Particularly preferred meanings for $X_1$ are chlorine or fluorine. A preferred embodiment of the invention relates to compounds of the formula (1) in which X and $X_1$ are each fluorine. Another preferred embodiment of the invention relates to compounds of the formula (1) in which X is chlorine and $X_1$ is fluorine.

Z is preferably $C_1$–$C_4$alkoxy, $C_1$–$C_4$alkylthio, hydroxyl, amino, N-$C_1$–$C_4$alkylamino which is unsubstituted or substituted by hydroxyl, sulfato or sulfo in the alkyl moiety, morpholino, phenylamino or N-$C_1$–$C_4$alkyl-N-phenylamino in which the phenyl is in each case unsubstituted or substituted by sulfo, carboxyl, acetylamino, methyl or methoxy, or a reactive radical of the abovementioned formulae (2a) to (2f) in which W is a group of the formula —CONH— or —NHCO—, $R_6$, $R_7$ and $R_8$ are each hydrogen, B is the radical —O— or —NH—, alk and alk' are each, independently of one another, ethylene or propylene, arylene is phenylene which is unsubstituted or substituted by methyl, methoxy, carboxyl or sulfo, Y is vinyl or β-sulfatoethyl, $Y_1$ is —CHBr—CH$_2$Br or —CBr=CH$_2$ and m is the number 0.

Z is particularly preferably amino, N-$C_1$–$C_4$alkylamino which is unsubstituted or substituted by hydroxyl, sulfato or sulfo in the alkyl moiety, morpholino, phenylamino or N-$C_1$–$C_4$alkyl-N-phenylamino in which the phenyl is in each case unsubstituted or substituted by sulfo, carboxyl, acetylamino, methyl or methoxy, or a fibre-reactive radical of the formula

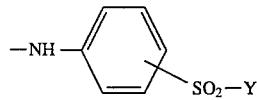

(2c')

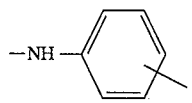

(2d')

in which Y is vinyl or β-sulfatoethyl.

Compounds of the formula (1) in which Z is a fibre-reactive radical of the abovementioned formula (2c') or (2d') are of particular interest.

n and $n_1$ are each, independently of one another, preferably the number 1.

Examples of substituents in the radical D are: alkyl groups having 1 to 12 carbon atoms, in particular 1 to 4 carbon atoms, such as methyl, ethyl, propyl, isopropyl or butyl, alkoxy groups having 1 to 8 carbon atoms, in particular 1 to 4 carbon atoms, such as methoxy, ethoxy, propoxy, isopropoxy or butoxy, alkanoylamino groups having 2 to 8 carbon atoms, in particular 2 to 4 carbon atoms, such as acetylamino or propionylamino, phenyl- or naphthylamino, alkoxycarbonylamino groups having 2 to 8 carbon atoms, in particular 2 to 4 carbon atoms, alkanoyl groups having 2 to 8 carbon atoms, in particular 2 to 4 carbon atoms, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, phenyl- or naphthylsulfonyl, alkoxycarbonyl having 1 to 4 carbon atoms in the alkoxy radical, such as methoxycarbonyl or ethoxycarbonyl, benzoyl, benzoylamino which can be substituted by $C_1$–$C_4$alkyl on the nitrogen, phenyl, naphthyl, amino, amino which is mono- or disubstituted by $C_1$–$C_{12}$alkyl, phenyl or naphthyl, or trifluoromethyl, nitro, cyano, hydroxyl, halogen such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di(β-hydroxyethyl)sulfamoyl, N-phenylsulfamoyl, ureido, carboxyl, sulfomethyl, sulfo or sulfato, as well as fibre-reactive radicals, it being possible for the substituents containing an alkyl, phenyl or naphthyl radical in the alkyl, phenyl or naphthyl radical to be further substituted, for example by the substituents mentioned above for D. The alkyl radicals can moreover be interrupted by oxygen (—O—).

Fibre-reactive radicals are to be understood as meaning those which are able to react with the hydroxyl groups of cellulose, the amino, carboxyl, hydroxyl and thiol groups of wool and silk, or the amino and possibly carboxyl groups of synthetic polyamides to form covalent chemical bonds. The fibre-reactive radicals are, as a rule, linked directly or via a linker to the rest of the dye. Examples of suitable fibre-reactive radicals are those which contain at least one substituent which can be eliminated on an aliphatic, aromatic or heterocyclic radical or in which the said radicals contain a radical suitable for reaction with the fibre material, for example a vinyl radical.

A fibre-reactive radical in D preferably corresponds to the formula $$—SO_2—Y \qquad (2g)$$

or $$—CONR_7\text{-alk-}SO_2—Y \qquad (2h),$$

in which alk, $R_7$ and Y have the abovementioned meaning.

Preferred meanings of D relate to:

a) Dye radicals of a 1:1 copper complex azo dye of the benzene or naphthalene series in which the copper atom is linked on each side to a metallizable group in each case in the ortho position to the azo bridge.

b) Dye radicals of a mono- or disazo dye of the formula $$D^*{-}N{=}N{-}(M{-}N{=}N)_u{-}K{-} \qquad (3a),$$

$$—D^*{-}N{=}N{-}(M{-}N{=}N)_u{-}K \qquad (3b)$$

or $$—D^*{-}N{=}N{-}(M{-}N{=}N)_u{-}K{-} \qquad (3c),$$

or of a metal complex derived therefrom; D* is the radical of a diazo component of the benzene or naphthalene series, M is the radical of a middle component of the benzene or naphthalene series, and K is the radical of a coupling component of the benzene, naphthalene, pyrazolone, 6-hydroxy-2-pyridone or acetoacetic arylamide series, where D*, M and K can carry substituents customary in azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups, halogen atoms; u is 0 or 1; and D*, M and K together contain at least two sulfo groups, preferably three or four sulfo groups.

c) Dye radicals of a disazo dye of the formula $$—D^*{-}N{=}N{-}K_1{-}N{=}N{-}D_1^* \qquad (4a)$$

or $$—D^*{-}N{=}N{-}K_1{-}N{=}N{-}D_1^*{-} \qquad (4b),$$

in which D* and $D_1^*$ are, independently of one another, the radical of a diazo component of the benzene or naphthalene series and $K_1$ is the radical of a coupling component of the naphthalene series; where D*, $D_1^*$ and $K_1$ can carry substituents customary in azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups, halogen atoms, and D*, $D_1^*$ and $K_1$ together contain at least two sulfo groups, preferably three or four sulfo groups.

d) Dye radicals of a formazan dye of the formula

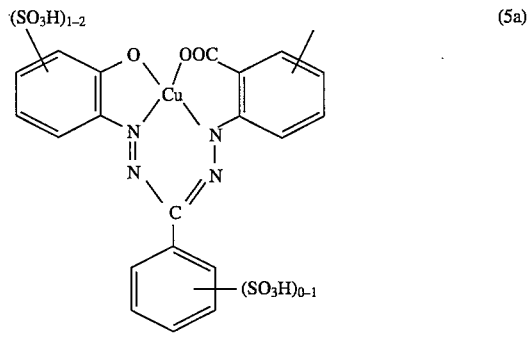

(5a)

or

-continued

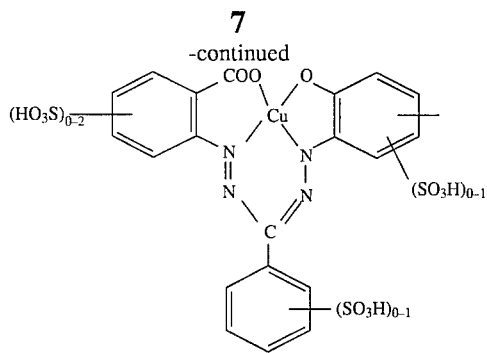 (5b)

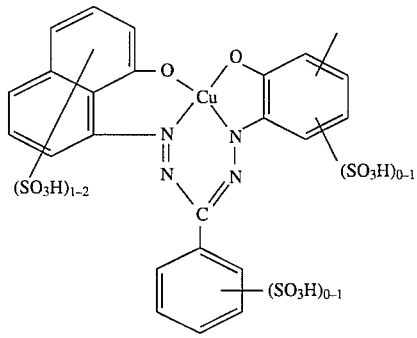 (5c)

or

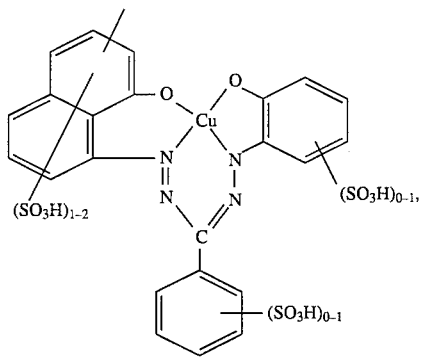 (5d)

in which the benzene nuclei can additionally be substituted by alkyl having 1 to 4 C atoms, alkoxy having 1 to 4 C atoms, alkylsulfonyl having 1 to 4 C atoms, halogen or carboxyl.

e) Dye radicals of an anthraquinone dye of the formula

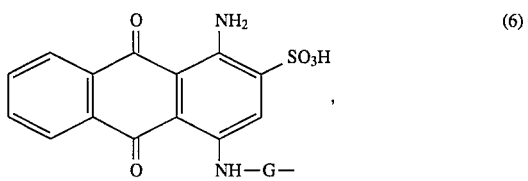 (6)

in which G is a phenylene, cyclohexylene, phenylenemethylene or $C_2$–$C_6$alkylene radical, preferably a phenylene, ethylene or propylene radical; where the anthraquinone nucleus can be substituted by another sulfo group, and G as phenyl radical can be substituted by alkyl having 1 to 4 C atoms, alkoxy having 1 to 4 C atoms, halogen, carboxyl or sulfo, and the dye preferably contains at least 2 sulfo groups.

f) Dye radicals of a phthalocyanine dye of the formula

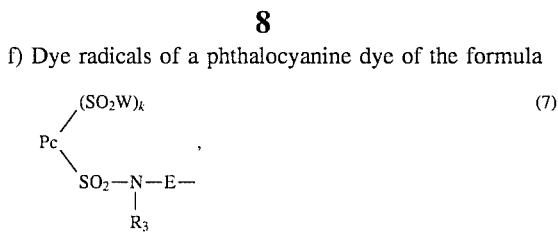 (7)

in which Pc is the radical of a copper or nickel phthalocyanine; W is —OH and/or —$NR_4R_5$; $R_4$ and $R_5$ are, independently of one another, hydrogen or alkyl which has 1 to 4 carbon atoms and can be substituted by hydroxyl or sulfo; $R_3$ is hydrogen or alkyl having 1 to 4 carbon atoms; E is a phenylene radical which can be substituted by alkyl having 1 to 4 C atoms, halogen, carboxyl or sulfo; or an alkylene radical having 2 to 6 C atoms, preferably a sulfophenylene or ethylene radical; and k is 1, 2 or 3.

g) Dye radicals of a dioxazine dye of the formula

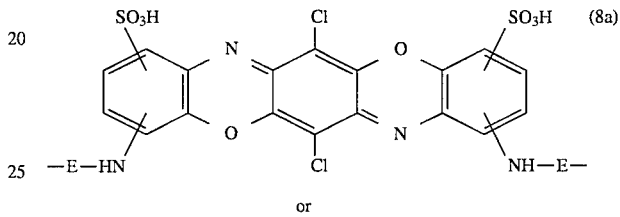 (8a)

or

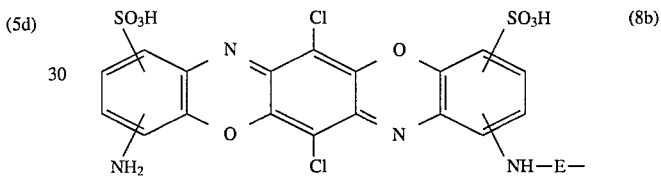 (8b)

or

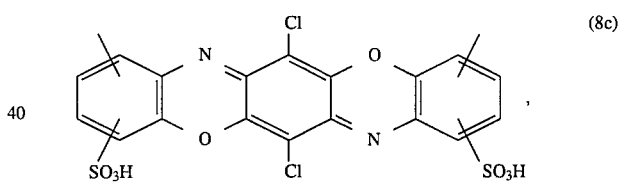 (8c)

in which E is a phenylene radical which can be substituted by alkyl having 1 to 4 C atoms, halogen, carboxyl or sulfo; or an alkylene radical having 2 to 6 C atoms; and the outer benzene rings in the formulae (8a), (8b) and (8c) can be further substituted by alkyl having 1 to 4 C atoms, alkoxy having 1 to 4 C atoms, acetylamino, nitro, halogen, carboxyl or sulfo.

D is preferably a monoazo or disazo chromophore radical of the formula (3a), (3b), (3c), (4a) or (4b) and is particularly preferably a monoazo chromophore radical.

Particularly preferred monoazo chromophore radicals D correspond to the formula

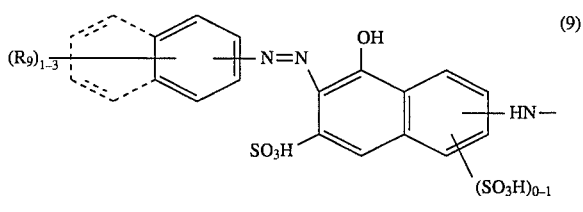 (9)

or

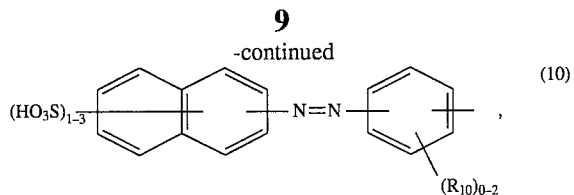

in which $(R_9)_{1-3}$ is 1 to 3 identical or different radicals from the group comprising sulfo, methyl, methoxy, acetylamino, sulfamoyl and radical of the formula $-SO_2-Y$ or $-CONH-alk-SO_2-Y$, in which alk and Y each have the abovementioned meaning, and $(R_{10})_{0-2}$ is 0 to 2 identical or different radicals from the group comprising methyl, 2-hydroxyethyl, methoxy, acetylamino, propionylamino, sulfo and ureido.

Particularly preferred monoazo chromophore radicals D correspond to the formula

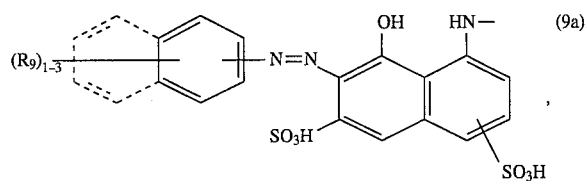

in which $(R_9)_{1-3}$ is 1 to 3 identical or different radicals from the group comprising sulfo, methyl, methoxy and radical of the formula $-SO_2-Y$ in which Y is vinyl or β-sulfatoethyl.

Preferred disazo chromophores D correspond to the formula

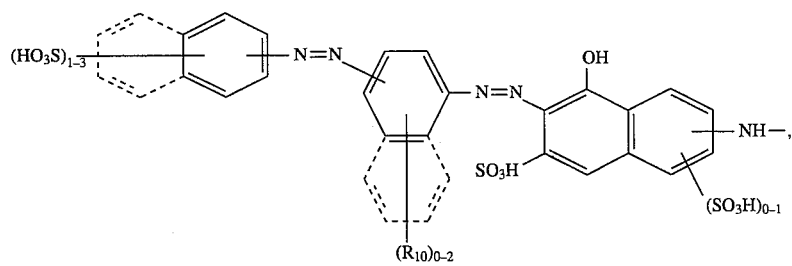

in which $(R_{10})_{0-2}$ have the abovementioned meaning.

A preferred embodiment of the present invention relates to compounds of the formula

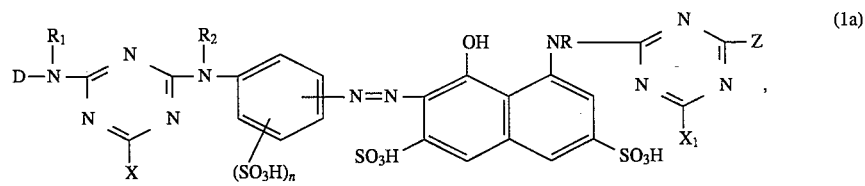

in which the abovementioned meanings and preferences apply in each case to D, R, $R_1$, $R_2$, X, $X_1$, Z, n and $n_1$.

A preferred subgroup is represented by compounds of the formula (1a) in which $R_1$ and $R_2$ are each, independently of one another, hydrogen, methyl or ethyl, n is the number 1, X is fluorine or chlorine, $X_1$ is fluorine, chlorine, amino, N-$C_1$-$C_4$alkylamino which is unsubstituted or substituted by hydroxyl, sulfato or sulfo in the alkyl moiety, morpholino or phenylamino or N-$C_1$-$C_4$alkyl-N-phenylamino in which the phenyl is in each case unsubstituted or substituted by sulfo, carboxyl, acetylamino, methyl or methoxy, Z is $C_1$-$C_4$alkoxy, $C_1$-$C_4$alkylthio, hydroxyl, amino, N-$C_1$-$C_4$alkylamino which is unsubstituted or substituted by hydroxyl, sulfato or sulfo in the alkyl moiety, morpholino, phenylamino or N-$C_1$-$C_4$alkyl-N-phenylamino in which the phenyl is in each case unsubstituted or substituted by sulfo, carboxyl, acetylamino, methyl or methoxy, or a reactive radical of the abovementioned formulae (2a) to (2f) in which W is a group of the formula $-CONH-$ or $-NHCO-$, $R_6$, $R_7$ and $R_8$ are each hydrogen, B is the radical $-O-$ or $-NH-$, alk and alk' are each, independently of one another, ethylene or propylene, arylene is phenylene which is unsubstituted or substituted by methyl, methoxy, carboxyl or sulfo, Y is vinyl or β-sulfatoethyl, $Y_1$ is $-CHBr-CH_2Br$ or $-CBr=CH_2$ and m is the number 0, and D is a radical of the abovementioned formula (9).

A particularly preferred subgroup is represented by compounds of the formula (1a) in which $R_1$ and $R_2$ are each hydrogen, n is the number 1, X is fluorine or chlorine, $X_1$ is fluorine, chlorine or morpholino, Z is amino, N-$C_1$-$C_4$alkylamino which is unsubstituted or substituted by hydroxyl, sulfato or sulfo in the alkyl moiety, morpholino, phenylamino or N-$C_1$-$C_4$alkyl-N-phenylamino in which the phenyl is in each case unsubstituted or substituted by sulfo, carboxyl, acetylamino, methyl or methoxy, or a fibre-reactive radical of the formula

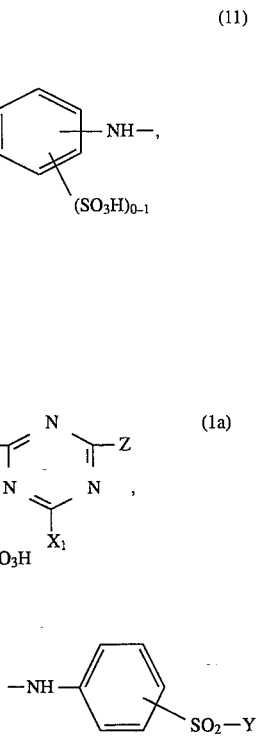

in which Y is vinyl or β-sulfatoethyl, and D is a radical of the abovementioned formula (9a).

Another preferred embodiment of the present invention relates to compounds of the formula

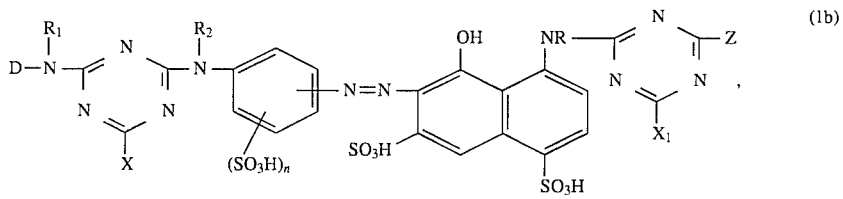

in which the abovementioned meanings and preferences apply in each case to D, R, $R_1$, $R_2$, X, $X_1$, Z, n and $n_1$.

Another preferred embodiment of the present invention relates to compounds of the formula

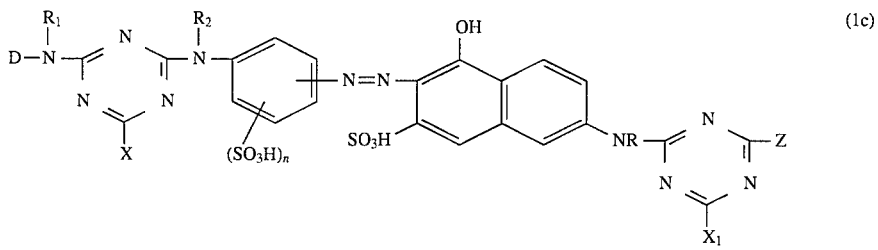

in which the abovementioned meanings and preferences apply in each case to D, R, $R_1$, $R_2$, X, $X_1$, Z, n und $n_1$.

The compounds of the formula (1) have at least two and preferably four to eight permanent sulfo or sulfato groups, i.e. sulfo or sulfato groups which are not eliminated on reaction of the reactive dye with the fibre material; these may in each case be present in the form of the free acid or, preferably in salt form, for example as in Na, Li, K or ammonium salt. The compounds of the formula (1) may also be in the form of a mixed salt, for example as Na/Li or Na/Li/ammonium salt.

The compounds of the formula (1) can be prepared in a manner known per se, for example by reacting together about 1 equivalent of an organic dye of the formula

or a dye precursor, about 1 equivalent of 2,4,6-trifluoro-s-triazine (cyanuric fluoride) or 2,4,6-trichloro-2-triazine (cyanuric chloride), about 1 equivalent of the compound of the formula

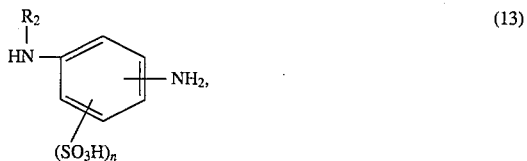

about 1 equivalent of the compound of the formula

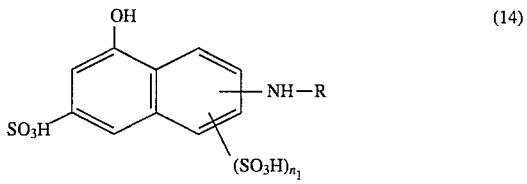

and about 1 equivalent of a compound of the formula

in which D, R, $R_1$, $R_2$, X, $X_1$, Z, n and $n_1$ each have the abovementioned meaning, and Hal is halogen, preferably fluorine or chlorine, by diazotization and coupling in any desired sequence, or, in the case of dye precursors, converting the resulting intermediates into the desired dyes and, if desired, following by another conversion reaction.

The preparation of the final dyes from precursors particularly comprises couplings which lead to azo dyes.

Since the individual process steps indicated above can be carried out in a different sequence, if desired in part also simultaneously, various process variants are possible. In general, the reaction is carried out in stepwise succession, and the sequence of the single reactions between the individual reaction components advantageously depends on the particular conditions.

In this connection, it depends on the structure of the starting materials which of the possible process variants give the best results or which specific conditions, for example which condensation temperature, are most advantageous for carrying out the reaction. Since hydrolysis of a halotriazinyl radical occurs under certain conditions, an intermediate which contains acetylamino groups must be hydrolysed to eliminate the acetyl groups before the condensation of a halotriazine.

A preferred variant for preparing the compounds of the formula (1) relates to the preparation of a compound of the formula

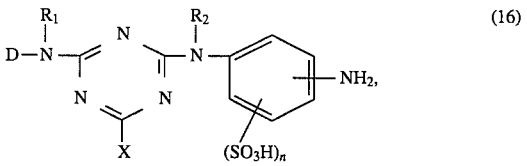

in which D, $R_1$, $R_2$, X and n each have the abovementioned meaning, diazotization of this compound and coupling with a compound of the formula

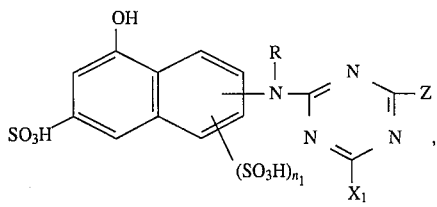

in which R, $X_1$, Z and $n_1$ each have the abovementioned meaning.

The compounds of the formulae (16) and (17) are known per se or can be obtained by methods known per se.

The invention furthermore relates to a process for dyeing and printing cellulosic fibre materials using the dyes of the formula 1 according to the invention. Examples of suitable fibre materials are the natural cellulosic fibres such as cotton, linen and hemp, as well as cellulose and regenerated cellulose. The dyes are also suitable for dyeing or printing fibres which contain hydroxyl groups and are present in blend fabrics, for example blends of cotton with polyamide fibres or, in particular, polyester fibres.

The dyes according to the invention can be applied to the fibre material and fixed to the fibre in various ways, in particular in the form of aqueous dye solutions and printing pastes. They are suitable both for the exhaust method and for dyeing by the pad-dyeing method, according to which the goods are impregnated with aqueous, if desired salt-containing, dye solutions, and the dyes are fixed after an alkali treatment or in the presence of alkali, if desired with the action of heat. After the fixing, the dyeings or printings are thoroughly washed with cold and hot water, if desired with the addition of a composition which has a dispersant action and promotes the diffusion of the unfixed product. The customary dyeing and printing methods are used for dyeing and printing.

The dyes are distinguished by a good fixing ability and a very good buildup ability. They can be used in the exhaust method over a very wide temperature range and are therefore also very suitable for dyeing cotton/polyester blend fabrics under the conditions recommended for such fabrics. The degrees of fixation are high, and the difference between the degree of exhaustion and the degree of fixation is remarkably small, i.e. the soaping loss is very low. The resulting dyeings are very reproducible and level. The dyes of the formula (1) are also suitable for printing, especially on cotton, but also for printing nitrogen-containing fibres, for example wool or silk or blend fabrics which contain wool or silk.

The dyeings and printings produced with the dyes according to the invention on cellulosic fibre materials have a high colour strength and a high fibre-dye linkage stability, both in the acidic and in the alkaline range, also a good fastness to light and very good wet fastness properties such as fastness to washing, to water, to seawater, to crossdyeing and to perspiration, as well as good fastness to pleating, to hot pressing and to rubbing and a very good fastness to chlorinated water.

The dyes of the formula (1) are either in the form of their free sulfonic acid or, preferably, as the salts thereof, such as the alkali metal, alkaline earth metal or ammonium salts or as salts of an organic amine. Examples which may be mentioned are the sodium, lithium or ammonium salts, the salt of triethanolamine or else mixed salts, for example Na/Li or Na/NH$_4$/Li.

The following examples serve to illustrate the invention. The temperatures are given in degrees Celsius, and parts and percentages are by weight, unless stated otherwise.

EXAMPLE 1

14 parts of cyanuric fluoride are added dropwise to a neutral solution of 53 parts of 7-(2-acetylamino-4-aminophenylazo)naphthalene-1,3,6-trisulfonic acid and 5 parts of disodium hydrogen phosphate in 500 parts of water at a temperature of about 0°–2° C. and, during this, the pH is kept constant by addition of sodium hydroxide solution. After the reaction is complete, a neutral solution of 19 parts of 1,3-diaminobenzene-4-sulfonic acid in 100 parts of water is added, the pH is kept at 5.5 by addition of sodium hydroxide solution, and the mixture is allowed to warm to room temperature. The resulting solution is cooled to about 0° C., 25 parts of 32% hydrochloric acid and 7 parts of sodium nitrite are added, and the mixture is stirred for about 1 hour. Excess nitrite is then decomposed with a little sulfamic acid, and the resulting suspension of the diazonium salt is added dropwise to a neutral, cold, aqueous solution of 53 parts of 1-(4-N-ethyl-N-phenylamino-6-fluoro-[1,3,5]-triazin-2-ylamino)-8-hydroxynaphthalene-3,6-disulfonic acid, during which the pH is kept constant by addition of sodium hydroxide solution. The solution is allowed to warm to room temperature and is dialysed to remove salt, and the dye of the formula

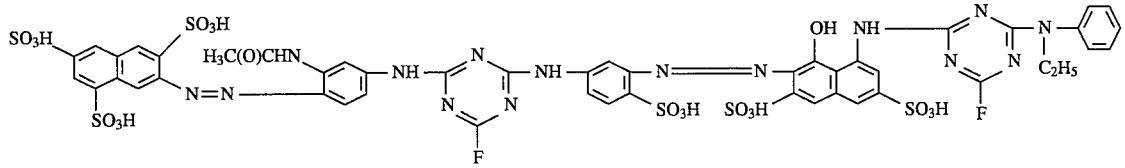

is evaporated. The resulting powder dyes cellulose in a brilliant orange shade with good general fastness properties.

EXAMPLE 2

14 parts of cyanuric fluoride are added dropwise to a neutral solution of 32 parts of 1-amino-8-hydroxynaphthalene-3,6-disulfonic acid and 5 parts of disodium hydrogen phosphate in 500 parts of water at a temperature of about 0°–2° C. and, during this, the pH is kept constant by addition of sodium hydroxide solution. After the reaction is complete, a neutral solution of 19 parts of 1,3-diaminobenzene-4-sulfonic acid in 100 parts of water is added, the pH is kept at 5.5 by addition of sodium hydroxide solution, and the mixture is allowed to warm to room temperature (solution 1).

25 parts of 32% hydrochloric acid and 7 parts of sodium nitrite are added to a neutral solution of 30 parts of 2-aminonaphthalene-1,5-disulfonic acid in 300 ml of water at about 0° C., and the mixture is stirred for about 1 hour. Excess nitrite is then decomposed with a little sulfamic acid, and the resulting suspension of the diazonium salt is added dropwise to the cooled solution 1, during which the pH is kept constant by addition of sodium hydroxide solution (solution 2).

25 parts of 32% hydrochloric acid and 7 parts of sodium nitrite are added to cold solution 2, and the mixture is stirred for about 1 hour. After decomposition of the excess nitrite with sulfamic acid, the suspension of the diazonium salt is added dropwise to a cooled aqueous solution of 53 parts of 1-(4-N-methyl-N-phenylamino-6-fluoro-[1,3,5]-triazin-2-ylamino)-8-hydroxynaphthalene-3,6-disulfonic acid, during which the pH is kept constant by addition of sodium hydroxide solution. The solution is allowed to warm to room temperature and is dialysed to remove salt, and the dye of the formula

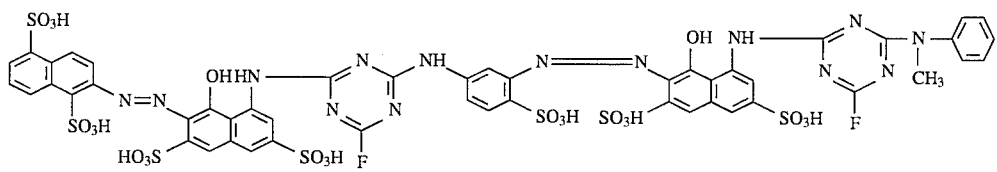

is evaporated. The resulting powder dyes cellulose in a brilliant red shade with good general fastness properties.

EXAMPLES 3–19

The compounds of the general formula

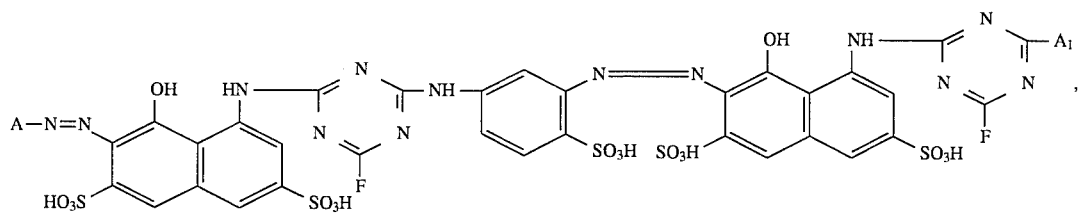

in which A and $A_1$ have the meanings mentioned in the following table, can be prepared as described in Examples 1 and 2, and each of them dyes cotton in a red shade with good general fastness properties.

|   | A | $A_1$ |
|---|---|---|
| 3 | ⌬—SO₃H (ortho) | —N(CH₃)—C₆H₅ |
| 4 | ⌬—SO₃H (ortho) | —N(C₂H₅)—C₆H₅ |
| 5 | ⌬—SO₃H (ortho) | —NH—C₆H₄—SO₃H (meta) |

-continued

| | A | A₁ |
|---|---|---|
| 6 | 2-sulfophenyl (SO₃H ortho on benzene) | —N(morpholino)—O (morpholine ring) |
| 7 | 2-sulfo-naphthalen-1-yl | —NH—C₆H₄—SO₃H (para) |
| 8 | 2,4-disulfophenyl | —N(C₂H₄OH)—C₆H₅ |
| 9 | 5-methyl-2-sulfophenyl | —NH₂ |
| 10 | 5-methyl-2,4-disulfophenyl | —NH—C₂H₅ |
| 11 | 5-methoxy-2-sulfophenyl | —NH—(CH₂)₂—SO₂—CH=CH₂ |
| 12 | 4-methyl-3-sulfophenyl | —NH—C₆H₄—SO₂—CH=CH₂ |
| 13 | 4-[HO₃SO—(H₂C)₂—O₂S]—phenyl | —NH—C₆H₄—SO₂—(CH₂)₂—OSO₃H |
| 14 | 4-[OC-NH-(CH₂)₂SO₂(CH₂)₂OSO₃H]-phenyl | —NH—C₆H₄—CO—NH—(H₂C)₂S O₂(CH₂)₂OSO₃H (meta) |
| 15 | 3-[OC-NH-(CH₂)₂SO₂(CH₂)₂OSO₃H]-phenyl | —NH—C₆H₄—CO—NH—(H₂C)₂SO₂(CH₂)₂OSO₃H (para) |

| | A | A₁ |
|---|---|---|
| 16 | naphthalene with SO₃H and HO₃SO(H₂C)₂O₂S substituents | —NH—phenyl with CO—NH—(H₂C)₂—SO₂—CH=CH₂ |
| 17 | H₂N—O₂S—phenyl— | —NH—phenyl—SO₂—CH=CH₂ |
| 18 | H₃C—OC—HN—phenyl— | —NH—phenyl with H₃C and SO₂—CH=CH₂ |
| 19 | HO₃S—phenyl—N=N—phenyl(SO₃H)— | —NH—phenyl—NHCOCBr=CH₂ |

EXAMPLES 20–36

The compounds of the general formula

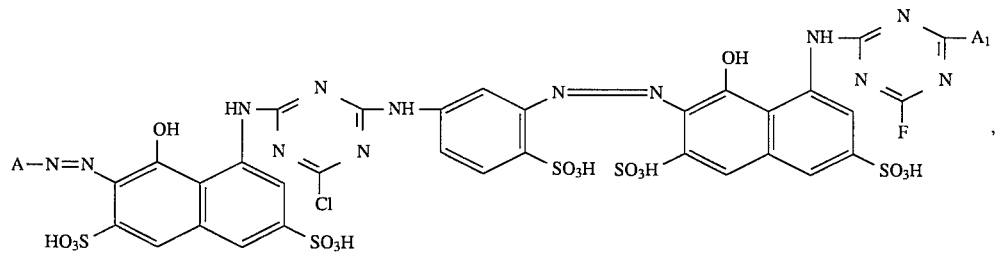

in which A and A₁ have the meanings mentioned in the following table, can be prepared as described in Examples 1 and 2, and each of them dyes cotton in a red shade with good general fastness properties.

| | A | A₁ |
|---|---|---|
| 20 | phenyl with SO₃H (ortho) | —N(CH₃)—phenyl |
| 21 | phenyl with SO₃H (ortho) | —N(C₂H₅)—phenyl |

-continued

| | A | A₁ |
|---|---|---|
| 22 | 2-methylbenzenesulfonic acid (SO₃H ortho to methyl on benzene) | —NH—(3-sulfophenyl) |
| 23 | 2-methylbenzenesulfonic acid | morpholino (—N(CH₂CH₂)₂O) |
| 24 | 2-methylnaphthalene-1-sulfonic acid | —NH—(4-sulfophenyl) |
| 25 | benzene with SO₃H and HO₃S (disulfo, methyl) | —N(C₂H₄OH)(phenyl) |
| 26 | 5-methyl-2-sulfobenzene (H₃C and SO₃H) | —NH₂ |
| 27 | benzene with H₃C, SO₃H, HO₃S substituents | —NH—C₂H₅ |
| 28 | 4-methoxy-2-sulfobenzene (H₃CO, SO₃H) | —NH—(CH₂)₂—SO₂—CH=CH₂ |
| 29 | benzene with H₃C and HO₃S substituents | —NH—(C₆H₄)—SO₂—CH=CH₂ |
| 30 | HO₃SO—(H₂C)₂—O₂S—(C₆H₄)— | —NH—(C₆H₄)—SO₂—(CH₂)₂—OSO₃H |
| 31 | 4-[OC-NH-(CH₂)₂SO₂(CH₂)₂OSO₃H]-phenyl | —NH—(C₆H₄)—CO—NH—(H₂C)₂O₂S(H₂C)₂OSO₃H |

| | A | $A_1$ |
|---|---|---|
| 32 | 3-(C(O)NH(CH$_2$)$_2$SO$_2$(CH$_2$)$_2$OSO$_3$H)-phenyl | $-NH-$C$_6$H$_4$-$CO-NH-$CH$_2$CH$_2$SO$_2$(CH$_2$)$_2$OSO$_3$H (para) |
| 33 | 6-(SO$_2$(CH$_2$)$_2$OSO$_3$H)-1-sulfo-naphth-2-yl | $-NH-$C$_6$H$_4$-$CO-NH-$(CH$_2$)$_2$-SO$_2$-CH=CH$_2$ (meta) |
| 34 | 4-(H$_2$N-SO$_2$)-phenyl | $-NH-$C$_6$H$_4$-SO$_2$-CH=CH$_2$ (meta) |
| 35 | 3-(H$_3$C-OC-HN)-phenyl | $-NH-$(4-CH$_3$, 3-SO$_2$-CH=CH$_2$)-phenyl |
| 36 | 4-HO$_3$S-C$_6$H$_4$-N=N-(2-SO$_3$H, 5-)-phenyl | $-NH-$C$_6$H$_4$-NHCOCBr=CH$_2$ (meta) |

EXAMPLES 37–53

The compounds of the general formula

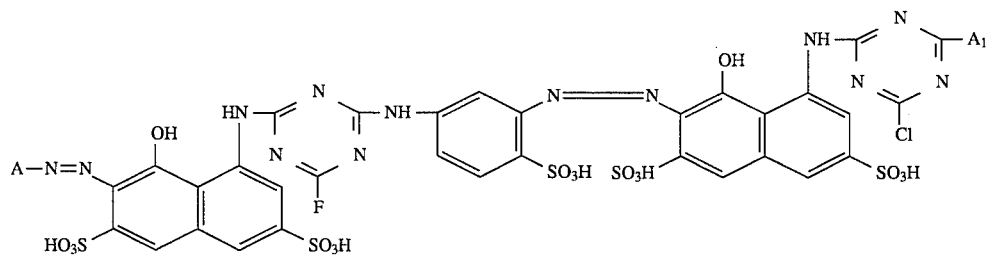

in which A and $A_1$ have the meanings mentioned in the following table, can be prepared as described in Examples 1 and 2, and each of them dyes cotton in a red shade with good general fastness properties.

| | A | A₁ |
|---|---|---|
| 37 | 2-sulfophenyl (benzene with SO₃H ortho) | —N(CH₃)—phenyl |
| 38 | 2-sulfophenyl | —N(C₂H₅)—phenyl |
| 39 | 2-sulfophenyl | —NH—(3-sulfophenyl) |
| 40 | 2-sulfophenyl | morpholino (—N(CH₂CH₂)₂O) |
| 41 | naphthalene-2-yl-1-sulfonic acid (1-SO₃H-naphth-2-yl) | —NH—(4-sulfophenyl) |
| 42 | 2,5-disulfophenyl | —N(C₂H₄OH)—phenyl |
| 43 | 5-methyl-2-sulfophenyl | —NH₂ |
| 44 | 5-methyl-2,4-disulfophenyl | —NH—C₂H₅ |
| 45 | 4-methoxy-2-sulfophenyl | —NH—(CH₂)₂—SO₂—CH=CH₂ |
| 46 | 4-methyl-2-sulfophenyl (with HO₃S) | —NH—(4-(SO₂—CH=CH₂)phenyl) |
| 47 | 4-(HO₃SO—(CH₂)₂—O₂S)—phenyl | —NH—(4-(SO₂—(CH₂)₂—OSO₃H)phenyl) |

-continued

| | A | A₁ |
|---|---|---|
| 48 | ![structure: para-substituted benzene with OC-NH-(CH₂)₂SO₂(CH₂)₂OSO₃H] | -NH-[phenyl]-CO-NH-(H₂C)₂O₂S(H₂C)₂OSO₃H (meta) |
| 49 | ![structure: meta-substituted benzene with OC-NH-(CH₂)₂SO₂(CH₂)₂OSO₃H] | -NH-[phenyl]-CO-NH-(H₂C)₂O₂S(H₂C)₂OSO₃H (para) |
| 50 | ![naphthalene with SO₃H and HO₃SO(H₂C)₂O₂S substituents] | -NH-[phenyl]-CO-NH-(H₂C)₂-O₂S-CH=CH₂ (meta) |
| 51 | H₂N-O₂S-[phenyl]- (para) | -NH-[phenyl]-SO₂-CH=CH₂ (meta) |
| 52 | H₃C-OC-HN-[phenyl]- (meta) | -NH-[phenyl with H₃C ortho and SO₂-CH=CH₂] |
| 53 | HO₃S-[phenyl]-N=N-[phenyl with SO₃H]- | -NH-[phenyl]-NHCOCBr=CH₂ (meta) |

EXAMPLES 54–70

The compounds of the general formula

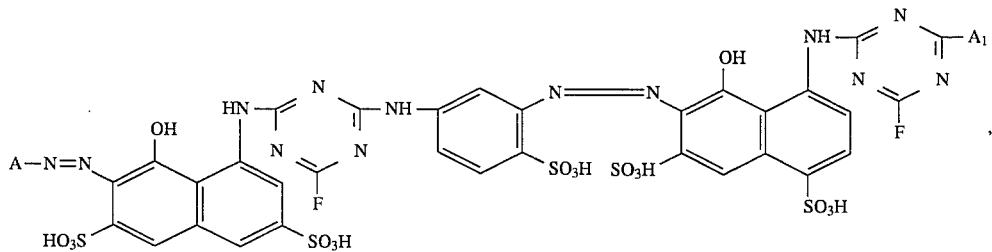

in which A and A₁ have the meanings mentioned in the following table, can be prepared as described in Examples 1 and 2, and each of them dyes cotton in a red shade with good general fastness properties.

| | A | A₁ |
|---|---|---|
| 54 | 2-sulfophenyl | N-methyl-N-phenylamino |
| 55 | 2-sulfophenyl | N-ethyl-N-phenylamino |
| 56 | 2-sulfophenyl | 3-sulfophenylamino (—NH—C₆H₄—SO₃H) |
| 57 | 2-sulfophenyl | morpholino |
| 58 | 2-sulfonaphth-1-yl | 4-sulfophenylamino (—NH—C₆H₄—SO₃H) |
| 59 | 2,4-disulfophenyl | N-(2-hydroxyethyl)-N-phenylamino |
| 60 | 5-methyl-2-sulfophenyl | —NH₂ |
| 61 | 5-methyl-2,4-disulfophenyl | —NH—C₂H₅ |
| 62 | 4-methoxy-2-sulfophenyl | —NH—(CH₂)₂—SO₂—CH=CH₂ |
| 63 | 4-methyl-2-sulfophenyl (H₃C / HO₃S substituted) | —NH—C₆H₄—SO₂—CH=CH₂ |
| 64 | 4-(2-sulfatoethylsulfonyl)phenyl (HO₃SO—(H₂C)₂—O₂S—C₆H₄—) | —NH—C₆H₄—SO₂—(CH₂)₂—OSO₃H |

| | A | A₁ |
|---|---|---|
| 65 | 4-(-NHCO-)phenyl-NH-(CH₂)₂SO₂(CH₂)₂OSO₃H | —NH—C₆H₄—CO—NH—(H₂C)₂O₂S(H₂C)₂OSO₃H (meta) |
| 66 | 3-(-CONH-)phenyl-(CH₂)₂SO₂(CH₂)₂OSO₃H | —NH—C₆H₄—CO—NH—(H₂C)₂O₂S(H₂C)₂OSO₃H (para) |
| 67 | 6-(HO₃SO(H₂C)₂O₂S-)-naphthalene-1-SO₃H (2-yl) | —NH—C₆H₄—CO—NH—(H₂C)₂—SO₂—CH=CH₂ (meta) |
| 68 | 4-(H₂N—O₂S-)phenyl | —NH—C₆H₄—SO₂—CH=CH₂ (meta) |
| 69 | 3-(H₃C—OC—HN-)phenyl | —NH—(2-CH₃, 5-SO₂CH=CH₂)phenyl |
| 70 | 4-HO₃S—C₆H₄—N=N—(2-SO₃H)-C₆H₃— | —NH—C₆H₄—NHCOCBr=CH₂ (meta) |

EXAMPLES 71–88

The compounds of the general formula

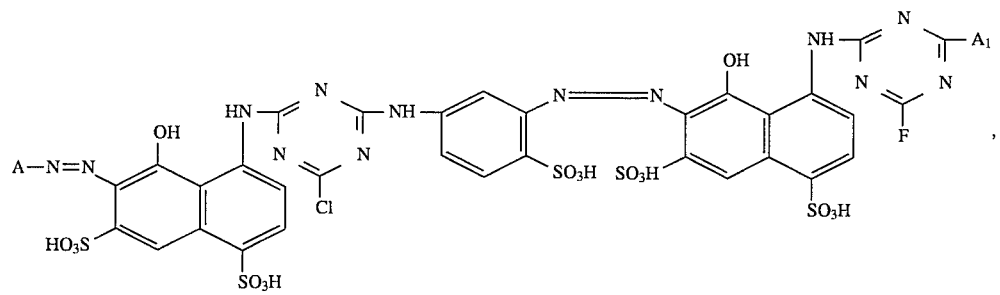

, in which A and A₁ have the meanings mentioned in the following table, can be prepared as described in Examples 1 and 2, and each of them dyes cotton in a red shade with good general fastness properties.

| | A | A₁ |
|---|---|---|
| 71 | 2-SO₃H-phenyl | −N(CH₃)−phenyl |
| 72 | 2-SO₃H-phenyl | −N(C₂H₅)−phenyl |
| 73 | 2-SO₃H-phenyl | −NH−(3-SO₃H-phenyl) |
| 74 | 2-SO₃H-phenyl | −N(morpholino) |
| 75 | 2-SO₃H-naphthyl (1-SO₃H, 2-position) | −NH−(4-SO₃H-phenyl) |
| 76 | 2,4-di-SO₃H-phenyl | −N(C₂H₄OH)−phenyl |
| 77 | 4-methyl-2-SO₃H-phenyl | −NH₂ |
| 78 | 4-methyl-2,5-di (HO₃S, SO₃H)-phenyl | −NH−C₂H₅ |
| 79 | 4-methoxy-2-SO₃H-phenyl | −NH−(CH₂)₂−SO₂−CH=CH₂ |

-continued

| | A | A₁ |
|---|---|---|
| 80 | 2-methyl-5-sulfo-phenyl (H₃C-, HO₃S-) | —NH—C₆H₄—SO₂—CH=CH₂ |
| 81 | HO₃SO—(H₂C)₂—O₂S—C₆H₄— | —NH—C₆H₄—SO₂—(CH₂)₂—OSO₃H |
| 82 | 4-(HO₃SO(CH₂)₂SO₂(CH₂)₂NHCO)—C₆H₄— | —NH—C₆H₄(meta)—CO—NH—(H₂C)₂S O₂(H₂C)₂OSO₃H |
| 83 | 3-(HO₃SO(CH₂)₂SO₂(CH₂)₂NHCO)—C₆H₄— | —NH—C₆H₄—CO—NH—(H₂C)₂S O₂(H₂C)₂OSO₃H |
| 84 | 6-(HO₃SO(H₂C)₂O₂S)-1-sulfo-naphth-2-yl | —NH—C₆H₄—CO—NH—(H₂C)₂—SO₂—CH=CH₂ |
| 85 | 4-(H₂N—O₂S)—C₆H₄— | —NH—C₆H₄—SO₂—CH=CH₂ |
| 86 | 2-(H₃C—OC—HN)—C₆H₄— (with H₃C) | —NH—C₆H₃(CH₃)—SO₂—CH=CH₂ |
| 87 | 4-HO₃S—C₆H₄—N=N—C₆H₃(SO₃H)— | —NH—C₆H₄—NHCOCBr=CH₂ |

EXAMPLES 88–100

The compounds of the general formula

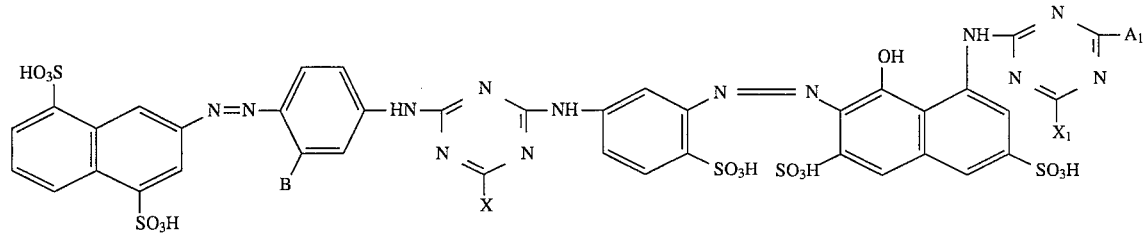

in which $A_1$, B, X and $X_1$ have the meanings mentioned in the following table, can be prepared as described in Examples 1 and 2, and each of them dyes cotton with good general fastness properties.

| Example No. | X | $X_1$ | B | $A_1$ |
|---|---|---|---|---|
| 88 | F | F | H | N-Methyl-N-phenylamino |
| 89 | F | F | —NHCOCH$_3$ | 3-Sulfophenylamino |
| 90 | F | F | —NHCOC$_2$H$_5$ | Morpholino |
| 91 | F | F | —CH$_3$ | 4-β-Sulfatoethyl-sulfonylphenylamino |
| 92 | F | F | —NHCOCH$_3$ | 3-β-Sulfatoethyl-sulfonylphenylamino |
| 93 | F | F | H | N-Ethyl-N-phenylamino |
| 94 | F | F | —CH$_3$ | 3-[2-(β-Sulfatoethyl-sulfonyl)-ethylamino-carbonyl]-phenylamino |
| 95 | F | F | —NHCOCH$_3$ | 4-[2-(β-Sulfatoethyl-sulfonyl)-ethylamino-carbonyl]-phenylamino |
| 96 | Cl | F | —NHCOC$_2$H$_5$ | 3-Sulfophenylamino |
| 97 | Cl | F | —CH$_3$ | Morpholino |
| 98 | Cl | F | —NHCOCH$_3$ | N-Methyl-N-phenylamino |
| 99 | Cl | F | H | 3-β-Sulfatoethyl-sulfonylphenylamino |
| 100 | Cl | F | —NHCOCH$_3$ | 4-β-Sulfatoethyl-sulfonylphenylamino |
| 101 | F | F | H | N-Methyl-N-phenylamino |
| 102 | F | F | —NHCOCH$_3$ | 3-Sulfophenylamino |
| 103 | F | F | —NHCOC$_2$H$_5$ | Morpholino |
| 104 | F | F | —CH$_3$ | 4-β-Sulfatoethyl-sulfonylphenylamino |
| 105 | F | F | —NHCOCH$_3$ | 3-β-Sulfatoethyl-sulfonylphenylamino |
| 106 | F | F | H | N-Ethyl-N-phenylamino |
| 107 | F | F | —CH$_3$ | 3-[2-(β-Sulfatoethyl-sulfonyl)-ethylamino-carbonyl]-phenylamino |
| 108 | F | F | —NHCOCH$_3$ | 4-[2-(β-Sulfatoethyl-sulfonyl)-ethylamino-carbonyl]-phenylamino |
| 109 | Cl | F | —NHCOC$_2$H$_5$ | 3-Sulfophenylamino |
| 110 | Cl | F | —CH$_3$ | Morpholino |
| 111 | Cl | F | —NHCOCH$_3$ | N-Methyl-N-phenylamino |
| 112 | Cl | F | H | 3-β-Sulfatoethyl-sulfonylphenylamino |
| 113 | Cl | F | —NHCOCH$_3$ | 4-β-Sulfatoethyl-sulfonylphenylamino |

EXAMPLES 101–113

The compounds of the general formula

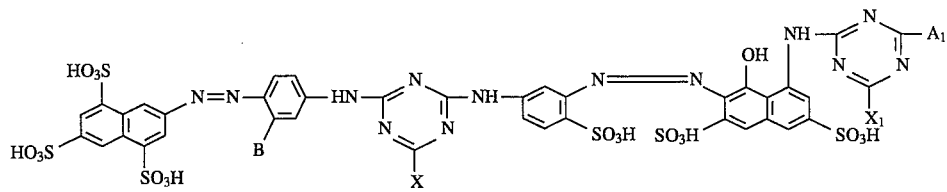

in which $A_1$, B, X and $X_1$ have the meanings mentioned in the following table, can be prepared as described in Examples 1 and 2, and each of them dyes cotton with good general fastness properties.

EXAMPLES 114–126

The compounds of the general formula

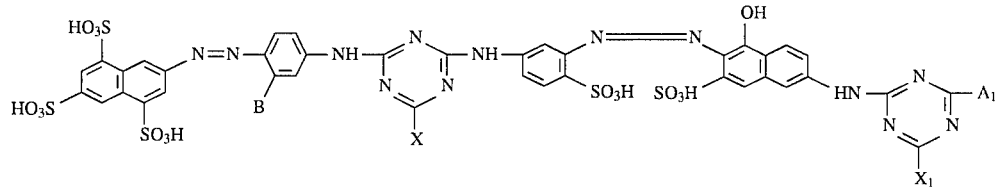

in which $A_1$, B, X and $X_1$ have the meanings mentioned in the following table, can be prepared as described in Examples 1 and 2, and each of them dyes cotton with good general fastness properties.

| Example No. | X | $X_1$ | B | $A_1$ |
|---|---|---|---|---|
| 114 | F | F | H | N-Methyl-N-phenylamino |
| 115 | F | F | —NHCOCH$_3$ | 3-Sulfophenylamino |
| 116 | F | F | —NHCOC$_2$H$_5$ | Morpholino |
| 117 | F | F | —CH$_3$ | 4-β-Sulfatoethyl-sulfonylphenylamino |
| 118 | F | F | —NHCOCH$_3$ | 3-β-Sulfatoethyl-sulfonylphenylamino |
| 119 | F | F | H | N-Ethyl-N-phenylamino |
| 120 | F | F | —CH$_3$ | 3-[2-(β-Sulfatoethyl-sulfonyl)-ethylamino-carbonyl]-phenylamino |
| 121 | F | F | —NHCOCH$_3$ | 4-[2-(β-Sulfatoethyl-sulfonyl)-ethylamino-carbonyl]-phenylamino |
| 122 | Cl | F | —NHCOC$_2$H$_5$ | 3-Sulfophenylamino |
| 123 | Cl | F | —CH$_3$ | Morpholino |
| 124 | Cl | F | —NHCOCH$_3$ | N-Methyl-N-phenylamino |
| 125 | Cl | F | H | 3-β-Sulfatoethyl-sulfonylphenylamino |
| 126 | Cl | F | —NHCOCH$_3$ | 4-β-Sulfatoethyl-sulfonylphenylamino |
| 132 | F | F | H | 1,5-di-sulfo-naphthyl-2-azo | N-Ethyl-N-phenylamino |
| 133 | F | F | CH$_3$ | H | 3-[2-(β-Sulfatoethyl-sulfonyl)-ethylamino-carbonyl]-phenylamino |
| 134 | F | F | OCH$_3$ | H | 4-[2-(β-Sulfatoethyl-sulfonyl)-ethylamino-carbonyl]-phenylamino |
| 135 | Cl | F | H | H | 3-Sulfophenylamino |
| 136 | Cl | F | H | SO$_3$H | Morpholino |
| 137 | Cl | F | OCH$_3$ | H | N-Methyl-N-phenylamino |
| 138 | Cl | F | H | H | 3-β-Sulfatoethyl-sulfonylphenylamino |
| 139 | Cl | F | CH$_3$ | SO$_3$H | 4-β-Sulfatoethyl-sulfonylphenylamino |

EXAMPLES 127–139

The compounds of the general formula

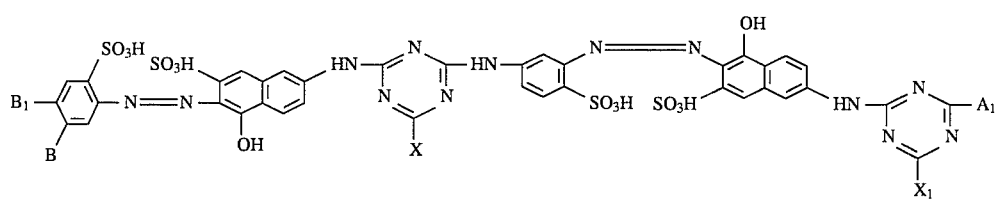

in which $A_1$, B, $B_1$, X and $X_1$ have the meanings mentioned in the following table, can be prepared as described in Examples 1 and 2, and each of them dyes cotton with good general fastness properties.

| Example No. | X | $X_1$ | $B_1$ | B | $A_1$ |
|---|---|---|---|---|---|
| 127 | F | F | H | H | N-Methyl-N-phenylamino |
| 128 | F | F | CH$_3$ | SO$_3$H | 3-Sulfophenylamino |
| 129 | F | F | OCH$_3$ | H | Morpholino |
| 130 | F | F | H | H | 4-β-Sulfatoethyl-sulfonylphenylamino |
| 131 | F | F | H | SO$_3$H | 3-β-Sulfatoethyl- |

EXAMPLES 139a TO 139e

The compounds of the general formula

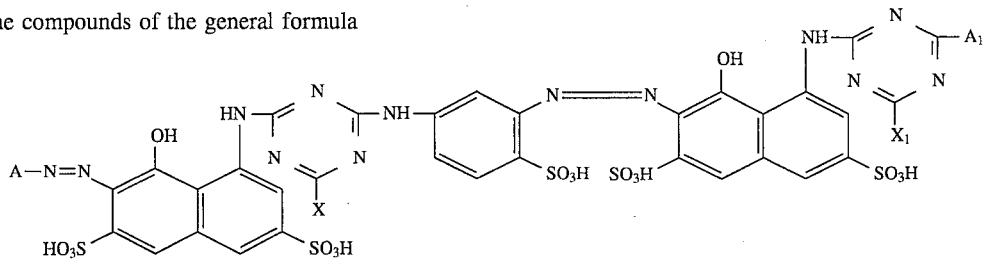

in which $A_1$, $A_1$, $X$ and $X_1$ have the meanings indicated in the table, can be prepared as described in Examples 1 and 2, and each of them dyes cotton with good general fastness properties.

| Example No. | X | $X_1$ | A | $A_1$ |
|---|---|---|---|---|
| 139a | Cl | F | 2-Sulfophenyl | N-Methyl-N-phenyl-amino |
| 139b | Cl | F | 1,5-Disulfo-2-naphthyl | N-Methyl-N-phenyl-amino |
| 139c | Cl | F | 1-Sulfo-2-naphthyl | N-Methyl-N-phenyl-amino |
| 139d | Cl | Cl | 4-Sulfatoethyl-sulfonylphenyl | 3-Sulfophenylamino |
| 139e | Cl | Morpholino | 4-Sulfatoethyl-sulfonylphenyl | Morpholino |

EXAMPLE 140

2 parts of dye according to Example 1 are dissolved in 400 parts of water; to this are added 1500 parts of a solution which contains 53 g of sodium chloride per liter. 100 parts of a cotton fabric are put in this dyebath at 40° C. After 45 minutes, 100 parts of a solution which contains 16 g of sodium hydroxide and 20 g of anhydrous $Na_2CO_3$ per liter are added. The temperature of the dyebath is kept at 40° C. for a further 45 minutes. The orange-coloured goods are then rinsed, soaped by boiling with a nonionic detergent for a quarter of an hour, rinsed once again and dried. The resulting goods are distinguished by very good fastness properties.

EXAMPLE 141

2 parts of the dye obtained in Example 1 are dissolved in 400 parts of water, to this are added 1500 parts of a solution which contains 53 g of sodium chloride per liter. 100 parts of a cotton fabric are put in this dyebath at 35° C. After 20 minutes, 100 parts of a solution which contains 16 g of sodium hydroxide and 20 g of anhydrous $Na_2CO_3$ per liter are added. The temperature of the dyebath is kept at 35° C. for a further 15 minutes. The temperature is then increased to 60° C. over the course of 20 minutes. The temperature is kept at 60° C. for a further 35 minutes. The orange-coloured goods are then rinsed, soaped by boiling with a nonionic detergent for a quarter of an hour, rinsed once again and dried. The resulting goods are distinguished by very good fastness properties.

EXAMPLE 142

8 parts of the dye obtained in Example 1 are dissolved in 400 parts of water, to this are added 1400 parts of a solution which contains 100 g of sodium sulfate per liter. 100 parts of a cotton fabric are put in this dyebath at 25° C. After 10 minutes, 200 parts of a solution which contains 150 g of trisodium phosphate per liter are added. The temperature of the dyebath is then increased to 60° C. over the course of 10 minutes. The temperature is kept at 60° C. for a further 90 minutes. The orange-coloured goods are then rinsed, soaped by boiling with a nonionic detergent for a quarter of an hour, rinsed once again and dried. The resulting goods are distinguished by very good fastness properties.

EXAMPLE 143

4 parts of the dye obtained in Example 1 are dissolved in 50 parts of water. To this are added 50 parts of a solution which contains 5 g of sodium hydroxide and 20 g of anhydrous $Na_2CO_3$ per liter. A cotton fabric is pad-dyed with the resulting solution so that its weight increases by 70%, and is then wound onto a roller. The cotton fabric is stored thus at room temperature for 3 hours. The goods, which have a navy blue colour, are then rinsed, soaped by boiling with a nonionic detergent for a quarter of an hour, rinsed once again and dried. The resulting goods are distinguished by very good fastness properties.

EXAMPLE 144

6 parts of the dye obtained in Example 1 are dissolved in 50 parts of water. To this are added 50 parts of a solution which contains 16 g of sodium hydroxide and 0.04 liter of waterglass (38°Bé) per liter. A cotton fabric is pad-dyed with the resulting solution so that its weight increases by 70%, and is then wound onto a roller. The cotton fabric is stored thus at room temperature for 10 hours. The orange-coloured goods are then rinsed, soaped by boiling with a nonionic detergent for a quarter of an hour, rinsed once again and dried. The resulting goods are distinguished by very good fastness properties.

EXAMPLE 145

2 parts of the dye obtained in Example 1 are dissolved in 100 parts of water with the addition of 0.5 part of sodium m-nitrobenzenesulfonate. A cotton fabric is impregnated with the resulting solution so that its weight increases by 75% and is then dried. The fabric is then impregnated with a solution, at 20° C., which contains 4 g of sodium hydroxide and 300 g of sodium chloride per liter and is pinched off to a weight gain of 75%, the orange dyeing is steamed at 100° to 102° C. for 30 seconds, rinsed, soaped in a boiling 0.3% solution of a nonionic detergent for a quarter of an hour, rinsed and dried. The resulting goods are distinguished by very good fastness properties.

EXAMPLE 146

3 parts of the dye obtained in Example 1 are scattered into 100 parts of a rapidly stirred stock thickener containing 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste obtained in this way and is dried, and the resulting printed material is steamed in saturated steam at 102° C. for 2 minutes. The orange-printed fabric is then rinsed, if desired soaped by boiling and rinsed once again, and subsequently dried. The resulting goods are distinguished by very good fastness properties.

EXAMPLE 147

5 parts of the dye obtained in Example 1 are scattered into 100 parts of a rapidly stirred stock thickener containing 50 parts of 5% sodium alginate thickener, 36.5 parts of water, 10 parts of urea, 1 part of sodium m-nitrobenzenesulfonate and 2.5 parts of sodium bicarbonate. A cotton fabric is printed with the printing paste obtained in this way, whose stability meets technical requirements, and is dried, and the resulting orange-printed material is steamed in saturated steam at 102° C. for 8 minutes. The printed fabric is then rinsed, if desired soaped by boiling and rinsed once again and subsequently dried. The resulting goods are distinguished by very good fastness properties.

What is claimed is:

1. A reactive dye of the formula

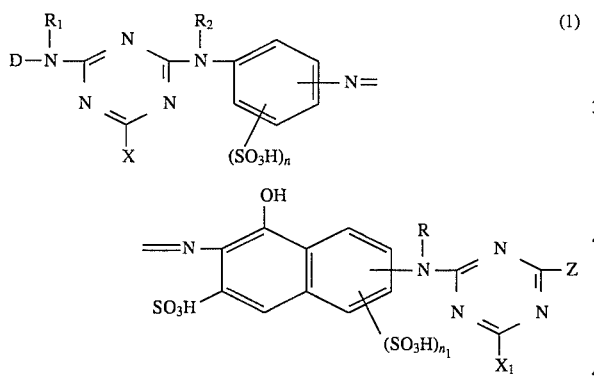

(1)

in which

D is the radical of a monoazo, polyazo, metal complex azo, anthraquinone, phthalocyanine, formazan or dioxazine chromophore which is devoid of a triazine fiber-reactive group, R, $R_1$ and $R_2$ are each, independently of one another, hydrogen or $C_1$–$C_4$alkyl which is unsubstituted or substituted by halogen, hydroxyl, cyano, $C_1$–$C_4$alkoxy, $C_1$–$C_4$alkoxycarbonyl, carboxyl, sulfamoyl, sulfo or sulfato, X is chlorine, fluorine, bromine, 3-carboxy-1-pyridinyl or 3-carbamoyl-1-pyridinyl, $X_1$ independently has one of the meanings specified for X, Z is a reactive radical of the formula

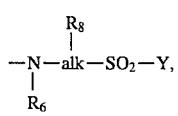 (2a)

—N—alk—B—alk'—SO$_2$—Y,  (2b)
|
R$_7$

—N—arylene—SO$_2$—Y,  (2c)
|
R$_7$

—N—arylene—(alk)$_{\overline{m}}$—W—alk'—SO$_2$—Y,  (2d)
|
R$_7$

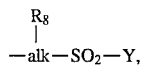 (2e)

or

—N—arylene—NH—CO—Y$_2$  (2f)
|
R$_7$ $R_6$ is hydrogen, $C_1$–$C_4$alkyl which is unsubstituted or substituted by hydroxyl, sulfo, sulfato, carboxyl or cyano, or a radical $$-alk-SO_2-Y,$$
with R$_8$ above alk, $R_7$ is hydrogen or $C_1$–$C_4$alkyl, $R_8$ is hydrogen, hydroxyl, sulfo, sulfato, carboxyl, cyano, halogen, $C_1$–$C_4$alkoxycarbonyl, C–$C_4$alkanoyloxy, carbamoyl or the group —SO$_2$—Y, alk and alk' are, independently of one another, $C_1$–$C_6$alkylene, arylene is a phenylene or naphthylene radical which is unsubstituted or substituted by sulfo, carboxyl, $C_1$–$C_4$alkyl, $C_1$–$C_4$alkoxy or halogen, Y is vinyl or a radical —CH$_2$—CH$_2$—U and U is a leaving group, $Y_1$ is a group —CHX$_2$—CH$_2$X$_2$ or —CX$_2$=CH$_2$ and $X_2$ is chlorine or bromine, B is the radical —O— or —NR$_7$—, W is a group —SO$_2$—NR$_6$—, —CONR$_6$— or —NR$_6$CO—, and m is the number 0 or 1, n is the number 1 or 2 and $n_1$ is the number 0 or 1.

2. A reactive dye according to claim 1, wherein R, $R_1$ and $R_2$ are each, independently of one another, hydrogen, methyl or ethyl.

3. A reactive dye according to claim 1, wherein X is chlorine or fluorine and $X_1$ is chlorine, fluorine, amino, N-$C_1$–$C_4$alkylamino which is unsubstituted or substituted by hydroxyl, sulfato or sulfo in the alkyl moiety, morpholino or phenylamino or N-$C_1$–$C_4$alkyl-N-phenylamino in which the phenyl is in each case unsubstituted or substituted by sulfo, carboxyl, acetylamino, methyl or methoxy.

4. A reactive dye according to claim 1, wherein D is the radical of a monoazo or disazo chromophore which is devoid of a triazine fiber-reactive group.

5. A reactive dye according to claim 1, wherein D is a monoazo chromophore of the formula

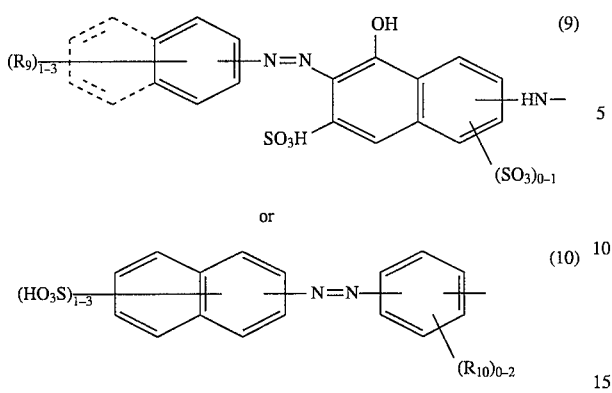

(9)

or (10)

in which $(R_9)_{1-3}$ is 1 to 3 identical or different radicals from the group consisting of sulfo, methyl, methoxy, acetylamino, sulfamoyl and radical of the formula —$SO_2$—Y or —CONH-alk-$SO_2$—Y in which alk and Y each have the meaning indicated in claim 1, and $(R_{10})_{0-2}$ is 0 to 2 identical or different radicals from the group consisting of methyl, 2-hydroxyethyl, methoxy, acetylamino, propionylamino, sulfo and ureido.

6. A reactive dye according to claim 1, wherein Z is a reactive radical of the formulae (2a) to (2f) in which W is a group of the formula —CONH— or —NHCO—, $R_6$, $R_7$ and $R_8$ are each hydrogen, B is the radical —O— or —NH—, alk and alk' are each, independently of one another, ethylene or propylene, arylene is phenylene which is unsubstituted or substituted by methyl, methoxy, carboxyl or sulfo, Y is vinyl or β-sulfatoethyl, $Y_1$ is —CHBr—$CH_2$Br or —CBr=$CH_2$ and m is the number 0.

7. A reactive dye according to claim 1, wherein Z is a fibre-reactive radical of the formula

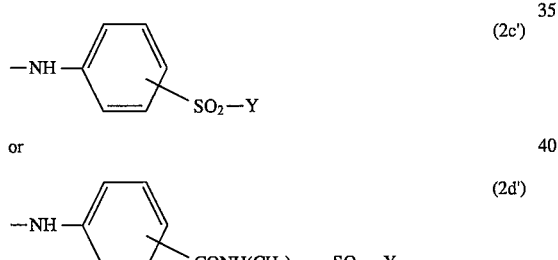

in which Y is vinyl or β-sulfatoethyl.

8. A reactive dye of the formula

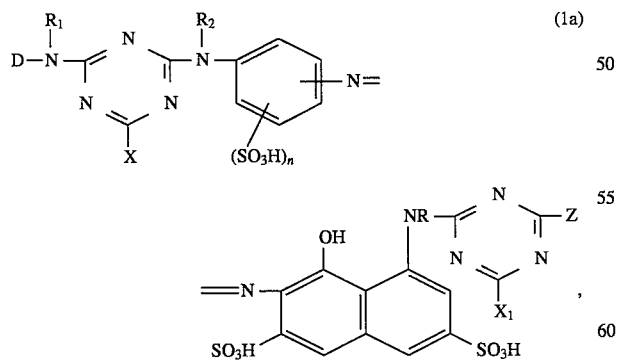

in which

D is the radical of a monoazo, polyazo, metal complex azo, anthraquinone, phthalocyanine, formazan or dioxazine chromophore which is devoid of a triazine fiber-reactive group, R, $R_1$ and $R_2$ are each, independently of one another, hydrogen or $C_1$-$C_4$alkyl which is unsubstituted or substituted by halogen, hydroxyl, cyano, $C_1$-$C_4$alkoxy, $C_1$-$C_4$alkoxycarbonyl, carboxyl, sulfamoyl, sulfo or sulfato, X is chlorine, fluorine, bromine, 3-carboxy-1-pyridinyl or 3-carbamoyl-1-pyridinyl, $X_1$ and Z each, independently of one another, have one of the meanings specified for X or are hydroxyl, $C_1$-$C_4$alkoxy, phenoxy, $C_1$-$C_4$alkylthio, morpholino, amino which is unsubstituted or substituted by unreactive radicals, or a reactive radical of the formula

 (2a)

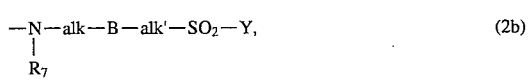 (2b)

 (2c)

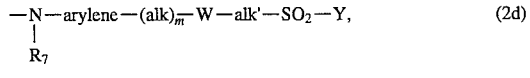 (2d)

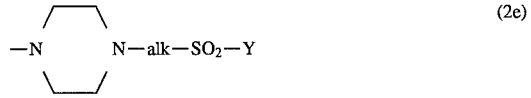 (2e)

or

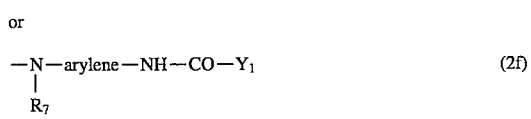 (2f)

$R_6$ is hydrogen, $C_1$-$C_4$alkyl which is unsubstituted or substituted by hydroxyl, sulfo, sulfato, carboxyl or cyano, or a radical

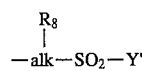

$R_7$ is hydrogen or $C_1$-$C_4$alkyl, $R_8$ is hydrogen, hydroxyl, sulfo, sulfato, carboxyl, cyano, halogen, $C_1$-$C_4$alkoxycarbonyl, $C_1$-$C_4$alkanoyloxy, carbamoyl or the group —$SO_2$—Y, alk and alk' are, independently of one another, $C_1$-$C_6$alkylene, arylene is a phenylene or naphthylene radical which is unsubstituted or substituted by sulfo, carboxyl, $C_1$-$C_4$alkyl, $C_1$-$C_4$alkoxy or halogen, Y is vinyl or a radical —$CH_2$—$CH_2$—U and U is a leaving group, $Y_1$ is a group —$CHX_2$—$CH_2X_2$ or —$CX_2$=$CH_2$ and $X_2$ is chlorine or bromine, B is the radical —O— or —$NR_7$—, W is a group —$SO_2$—$NR_6$—, —$CONR_6$— or —$NR_6CO$—, and m is the number 0 or 1, n is the number 1 or 2 and $n_1$ is the number 0 or 1.

9. A reactive dye according to claim 8, wherein Z is amino, N-$C_1$-$C_4$alkylamino or N,N-di-$C_1$-$C_4$alkylamino where the alkyl is unsubstituted or substituted by sulfo, sulfato, hydroxyl, carboxyl or phenyl, or cyclohexylamino, N-$C_1$-$C_4$alkyl-N-phenylamino or phenylamino or naphthylamino where the phenyl or naphthyl is unsubstituted or substituted by $C_1$-$C_4$alkyl, $C_1$-$C_4$alkoxy, $C_2$-$C_4$alkanoylamino, carboxyl, sulfo or halogen.

10. A reactive dye according to claim 8 of the formula (1a), wherein $R_1$ and $R_2$ are each, independently of one another, hydrogen, methyl or ethyl, n is the number 1, X is fluorine or chlorine, $X_1$ is fluorine, chlorine, amino, N-$C_1$-$C_4$alkylamino which is unsubstituted or substituted by hydroxyl, sulfato or sulfo in the alkyl moiety, morpholino or phenylamino or N-$C_1$-$C_4$alkyl-N-phenylamino in which the phenyl is in each case unsubstituted or substituted by sulfo, carboxyl, acetylamino, methyl or methoxy, Z is $C_1$-$C_4$alkoxy, $C_1$-$C_4$alkylthio, hydroxyl, amino, N-$C_1$-$C_4$alkylamino which is unsubstituted or substituted by hydroxyl, sulfato or sulfo in the alkyl moiety, morpholino, phenylamino or N-$C_1$-$C_4$alkyl-N-phenylamino in which the phenyl is in each case unsubstituted or substituted by sulfo, carboxyl, acetylamino, methyl or methoxy, or a reactive radical of the formulae

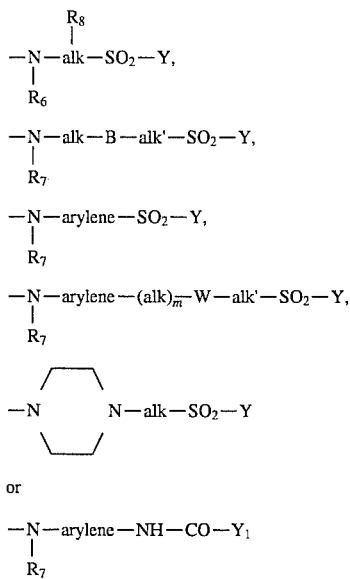

in which W is a group of the formula —CONH— or —NHCO—, $R_6$, $R_7$ and $R_8$ are each hydrogen, B is the radical —O— or —NH—, alk and alk' are each, independently of one another, ethylene or propylene, arylene is phenylene which is unsubstituted or substituted by methyl, methoxy, carboxyl or sulfo, Y is vinyl or β-sulfatoethyl, $Y_1$ is —CHBr—$CH_2$Br or —CBr=$CH_2$ and m is the number 0, and D is a radical of the formula

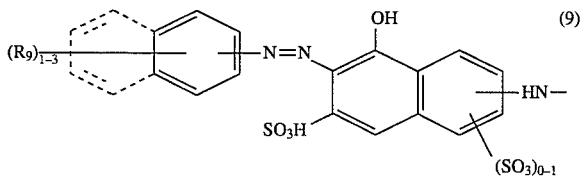

in which $(R_9)_{1-3}$ is 1 to 3 identical or different radicals from the group consisting of sulfo, methyl, methoxy, acetylamino, sulfamoyl and radical of the formula —$SO_2$—Y or —CONH-alk-$SO_2$—Y in which alk and Y each have the meaning as indicated above.

11. A reactive dye according to claim 8 of the formula (Ia), wherein $R_1$ and $R_2$ are each hydrogen, n is the number 1, X is fluorine or chlorine, $X_1$ is fluorine, chlorine or morpholino, Z is amino, N-$C_1$-$C_4$alkylamino which is unsubstituted or substituted by hydroxyl, sulfato or sulfo in the alkyl moiety, morpholino, phenylamino or N-$C_1$-$C_4$alkyl-N-phenylamino in which the phenyl is in each case unsubstituted or substituted by sulfo, carboxyl, acetylamino, methyl or methoxy, or a fibre-reactive radical of the formula

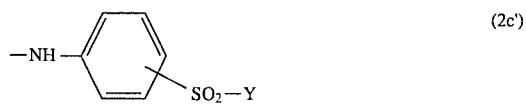

or

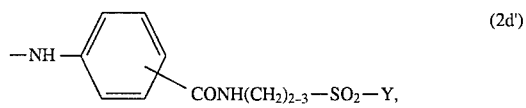

in which Y is vinyl or β-sulfatoethyl, and D is a radical of the formula

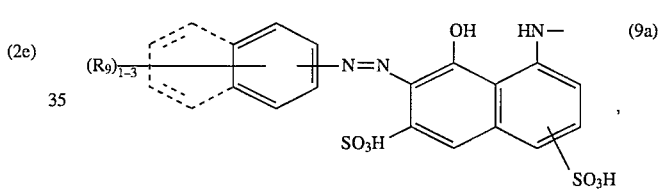

in which $(R_9)_{1-3}$ is 1 to 3 identical or different radicals from the group consisting of sulfo, methyl, methoxy and radical of the formula —$SO_2$—Y in which Y is vinyl or β-sulfatoethyl.

12. A method for dyeing or printing cellulosic fibre materials, which comprises contacting these materials in an aqueous dyebath with a tinctorially effective amount of one or more reactive dyes of the formula (1) according to claim 1.

13. A method for dyeing or printing cellulosic fibre materials, which comprises contacting these materials in an aqueous dyebath with a tictorially effective amount of one or more reactive dyes of the formula (1a) according to claim 8.

* * * * *